(12) United States Patent
Hull et al.

(10) Patent No.: US 11,488,029 B2
(45) Date of Patent: Nov. 1, 2022

(54) COGNITIVE PROCESS CODE GENERATION

(71) Applicant: International Business Machines Corporation, Armonk, NY (US)

(72) Inventors: Richard B. Hull, Chatham, NJ (US); Hamid R. Motahari Nezhad, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 15/706,156

(22) Filed: Sep. 15, 2017

(65) Prior Publication Data

US 2019/0087731 A1    Mar. 21, 2019

(51) Int. Cl.
  *G06N 5/02*    (2006.01)
  *G06F 8/35*    (2018.01)
  *G06Q 10/06*   (2012.01)
  *G06F 8/20*    (2018.01)

(52) U.S. Cl.
  CPC ............... *G06N 5/02* (2013.01); *G06F 8/20* (2013.01); *G06F 8/35* (2013.01); *G06Q 10/067* (2013.01)

(58) Field of Classification Search
  CPC .... G06N 5/02; G06F 8/35; G06F 8/20; G06Q 10/067
  USPC .......................................................... 706/46
  See application file for complete search history.

(56) References Cited

U.S. PATENT DOCUMENTS

| | | | |
|---|---|---|---|
| 5,321,812 A | 6/1994 | Benedict et al. | |
| 5,960,420 A | 9/1999 | Leymann et al. | |
| 6,038,538 A | 3/2000 | Agrawal et al. | |
| 6,041,306 A | 3/2000 | Du et al. | |
| 6,279,009 B1 | 8/2001 | Smirnov et al. | |
| 6,892,192 B1 | 5/2005 | Geddes et al. | |
| 6,963,875 B2 | 11/2005 | Moore et al. | |
| 6,985,900 B2 | 1/2006 | Codd et al. | |
| 7,069,179 B2 | 6/2006 | Kim et al. | |
| 7,493,593 B2 | 2/2009 | Koehler et al. | |
| 7,599,901 B2 | 10/2009 | Mital et al. | |
| 7,600,007 B1 | 10/2009 | Lewis et al. | |

(Continued)

FOREIGN PATENT DOCUMENTS

WO    2016153464 A1    9/2016

OTHER PUBLICATIONS

Starfish: A Self-tuning System for Big Data Analyti (Year: 2011).*

(Continued)

*Primary Examiner* — Tsu-Chang Lee
(74) *Attorney, Agent, or Firm* — Sherman IP LLP; Kenneth L. Sherman; Steven Laut

(57) ABSTRACT

One embodiment provides for generating a cognitive executable process graph including obtaining, by a processor, a hybrid process knowledge graph generated based process fragments and a set of actionable statements and business constraints. The hybrid process knowledge graph including different node types. The hybrid knowledge graph is traversed from a root of a process through each task in the hybrid process knowledge graph to obtain an action and metadata for each task node. Based on the action and metadata, at least one statement in an equivalent executable code block is created to represent the action. A cognitive executable process graph is generated based on at least one executable code block.

20 Claims, 13 Drawing Sheets

(56) References Cited

U.S. PATENT DOCUMENTS

| | | | |
|---|---|---|---|
| 7,634,467 | B2 | 12/2009 | Ryan et al. |
| 7,904,302 | B2 | 3/2011 | Adendorff et al. |
| 7,925,659 | B2 | 4/2011 | Wefers et al. |
| 8,020,104 | B2 | 9/2011 | Robarts et al. |
| 8,073,865 | B2 | 12/2011 | Davis |
| 8,091,071 | B2 * | 1/2012 | Tsantilis ............... G06F 8/36 715/240 |
| 8,099,376 | B2 | 1/2012 | Serrano-Morales et al. |
| 8,265,979 | B2 | 9/2012 | Golani et al. |
| 8,266,148 | B2 | 9/2012 | Guha et al. |
| 8,352,414 | B2 | 1/2013 | Bhamidipaty et al. |
| 8,386,996 | B2 | 2/2013 | Prigge et al. |
| 8,396,815 | B2 | 3/2013 | Drory et al. |
| 8,447,859 | B2 | 5/2013 | Bobak et al. |
| 8,606,622 | B2 | 12/2013 | Chang et al. |
| 8,615,422 | B1 * | 12/2013 | Alkasimi ........... G06Q 30/0206 705/7.35 |
| 8,676,818 | B2 | 3/2014 | Curbera et al. |
| 8,949,773 | B2 | 2/2015 | Paradkar et al. |
| 9,251,489 | B2 | 2/2016 | Chan et al. |
| 9,348,560 | B2 * | 5/2016 | Xie ..................... G06F 8/34 |
| 9,384,322 | B2 | 7/2016 | Sasidhar |
| 9,503,464 | B2 | 11/2016 | Zahran |
| 9,542,388 | B2 | 1/2017 | Carrier et al. |
| 9,953,081 | B2 | 4/2018 | Gomadam et al. |
| 2001/0032092 | A1 | 10/2001 | Calver et al. |
| 2001/0049615 | A1 | 12/2001 | Wong et al. |
| 2002/0116362 | A1 | 8/2002 | Li et al. |
| 2002/0194042 | A1 | 12/2002 | Sands et al. |
| 2003/0187743 | A1 | 10/2003 | Kumaran et al. |
| 2004/0162741 | A1 | 8/2004 | Flaxer et al. |
| 2004/0260590 | A1 | 12/2004 | Golani et al. |
| 2006/0080159 | A1 | 4/2006 | Kumar |
| 2006/0085205 | A1 | 4/2006 | Kumar |
| 2006/0111921 | A1 | 5/2006 | Chang et al. |
| 2007/0150330 | A1 | 6/2007 | McGoveran |
| 2007/0174710 | A1 | 7/2007 | Duan et al. |
| 2007/0239570 | A1 * | 10/2007 | Kam-Chak Cheng ........................ G06Q 10/10 705/35 |
| 2008/0086499 | A1 | 4/2008 | Wefers et al. |
| 2008/0183744 | A1 | 7/2008 | Adendorff et al. |
| 2009/0112667 | A1 | 4/2009 | Blackwell et al. |
| 2009/0157812 | A1 | 6/2009 | Bavly et al. |
| 2009/0172689 | A1 | 7/2009 | Bobak et al. |
| 2009/0177634 | A1 | 7/2009 | Behrendt et al. |
| 2009/0228309 | A1 | 9/2009 | Moll et al. |
| 2009/0228428 | A1 | 9/2009 | Dan et al. |
| 2010/0114629 | A1 | 5/2010 | Adler et al. |
| 2010/0325206 | A1 | 12/2010 | Dayal et al. |
| 2011/0270639 | A1 | 11/2011 | Blackwell et al. |
| 2011/0270794 | A1 | 11/2011 | Drory et al. |
| 2011/0320491 | A1 | 12/2011 | Jung et al. |
| 2012/0166254 | A1 | 6/2012 | Chang et al. |
| 2012/0197631 | A1 | 8/2012 | Ramani et al. |
| 2013/0085799 | A1 | 4/2013 | Zhang et al. |
| 2013/0124450 | A1 | 5/2013 | Drory et al. |
| 2014/0129294 | A1 * | 5/2014 | Rosenberg ......... G06Q 30/0283 705/7.35 |
| 2014/0351261 | A1 | 11/2014 | Aswani et al. |
| 2015/0095094 | A1 | 4/2015 | Chan et al. |
| 2015/0095303 | A1 * | 4/2015 | Sonmez ................. G06N 5/003 707/707 |
| 2015/0142718 | A1 * | 5/2015 | Bostick .................. G06N 5/025 706/47 |
| 2015/0170088 | A1 * | 6/2015 | Rizk ......................... G06F 8/34 705/7.26 |
| 2015/0235154 | A1 | 8/2015 | Utschig |
| 2016/0071031 | A1 | 3/2016 | Daley et al. |
| 2016/0080422 | A1 | 3/2016 | Belgodere et al. |
| 2016/0085852 | A1 | 3/2016 | Deshpande et al. |
| 2016/0147514 | A1 * | 5/2016 | Baskaran ............. G06F 8/4434 717/150 |
| 2016/0328371 | A1 | 11/2016 | Logan et al. |
| 2016/0373456 | A1 | 12/2016 | Vermeulen et al. |
| 2017/0004203 | A1 | 1/2017 | Pandit et al. |
| 2017/0060945 | A1 * | 3/2017 | Bastide ............ G06F 16/24542 |
| 2017/0091664 | A1 | 3/2017 | Sanchez et al. |
| 2017/0168779 | A1 * | 6/2017 | Sevenich ................ G06F 8/456 |
| 2017/0185674 | A1 * | 6/2017 | Tonkin .................. G06F 16/328 |
| 2017/0193551 | A1 * | 7/2017 | Santi .................. G06Q 30/0275 |
| 2017/0243118 | A1 | 8/2017 | Nassar et al. |
| 2017/0277680 | A1 | 9/2017 | Ajmera et al. |
| 2018/0053327 | A1 | 2/2018 | Contractor et al. |
| 2018/0114121 | A1 | 4/2018 | Rana et al. |
| 2018/0129959 | A1 | 5/2018 | Gustafson et al. |
| 2018/0203833 | A1 * | 7/2018 | Liang .................. G06F 40/205 |
| 2020/0160239 | A1 | 5/2020 | Hull et al. |

OTHER PUBLICATIONS

A Selftuning System for Big Data Analytics (Year: 2011).*

Huang et al., "Enhancing UML Class Diagram Abstraction with Knowledge graph", IDEAL 2016 (Year: 2016).*

Gruhn, V. et al., "Reducing the Cognitive Complexity of Business Process Models," 8th IEEE International Conference on Cognitive Informatics, Sep. 2009, pp. 339-345, IEEE, United States.

Simoes, D., et al., "Modelling Sensible Business Processes," FDSE 2015 Proceedings of the Second International Conference on Future Data and Security Engineering, Nov. 2015, pp. 165-182, vol. 9446, Springer, Vietnam.

Hull, R., et al., "Rethinking BPM in a Cognitive World: Transforming How We Learn and Perform Business Processes," 14th International Conference BPM 2016, Sep. 18-22, 2016, pp. 1-16, Springer, Rio de Janeiro, Brazil.

Mell, P., et al., "The NIST Definition of Cloud Computing", National Institute of Standards and Technology Special Publication 800-145, Sep. 2011, pp. 1-7, U.S. Department of Commerce, United States.

Wang, M., et al., "From Process Logic to Business Logic—A Cognitive Approach to Business Process Management," Information & Management, 2006, pp. 179-193, V. 43, No. 2, Elsevier, Netherlands.

Huang, Z., et al., "Reinforcement Learning Based Resource Allocation in Business Process Management," Data & Knowledge Engineering, 2011, pp. 127-145, vol. 70, No. 1, Elsevier, Netherlands.

List of IBM Patents or Applications Treated as Related; List of IBM Patents or Applications Treated as Related: Hull, R.H., U.S. Appl. No. 16/752,946, filed Jan. 27, 2020.

List of IBM Patents or Applications Treated as Related.

Bhattacharya, K et al., "Towards Formal Analysis of Artifact-Centric Business Process Models", International Conference on Business Process Management, Sep. 24, 2007, pp. 288-304), Springer, Berlin, Heidelberg.

Markovic, I. et al., "Linking Business Goals to Process Models in Semantic Business Process Modeling", 12th International IEEE Enterprise Distributed Object Computing Conference, Sep. 15, 2008, pp. 332-338, IEEE, United States.

* cited by examiner

COGNITIVE PROCESS CODE GENERATION

BACKGROUND

Current business process execution engines adopt the sequential cycle of Define-Execute-Improve for processes, without the ability to change the process model (in terms of actions identified, as well as the sequence of actions) during a process execution. However, many business processes require adaptation of the process logic as the process is executed, by observing new data from the world.

There are many business processes that are described in unstructured information sources, and manually executed. Handling and managing work (processes) conventionally involves interaction among employees, systems and devices. Interactions occur over email, chat, and messaging apps. Descriptions exist for processes, procedures, policies, laws, rules, regulations, plans, external entities (such as customers, partners and government agencies), surrounding world, news, social networks, etc. In many cases, especially with so-called "Knowledge-intensive Processes (KiP's)", there may be substantial variation between different enactments of a process, in terms of the steps actually performed and the sequencing of those steps. Furthermore, the continued inclusion of ever-changing external information into processing decisions and steps makes it impossible to use conventional business processing approaches to specify in advance a conventional business process management (BPM) model that all of the process enactments will follow.

SUMMARY

Embodiments relate to generating cognitive executable process graphs from a hybrid process knowledge graph. One embodiment provides for generating a cognitive executable process graph including obtaining, by a processor, a hybrid process knowledge graph generated based process fragments and a set of actionable statements and business constraints. The hybrid process knowledge graph includes different node types. The hybrid knowledge graph is traversed from a root of a process through each task in the hybrid process knowledge graph to obtain an action and metadata for each task node. Based on the action and metadata, at least one statement in an equivalent executable code block is created to represent the action. A cognitive executable process graph is generated based on at least one executable code block.

These and other features, aspects and advantages of the present invention will become understood with reference to the following description, appended claims and accompanying figures.

DETAILED DESCRIPTION

Figure 1:
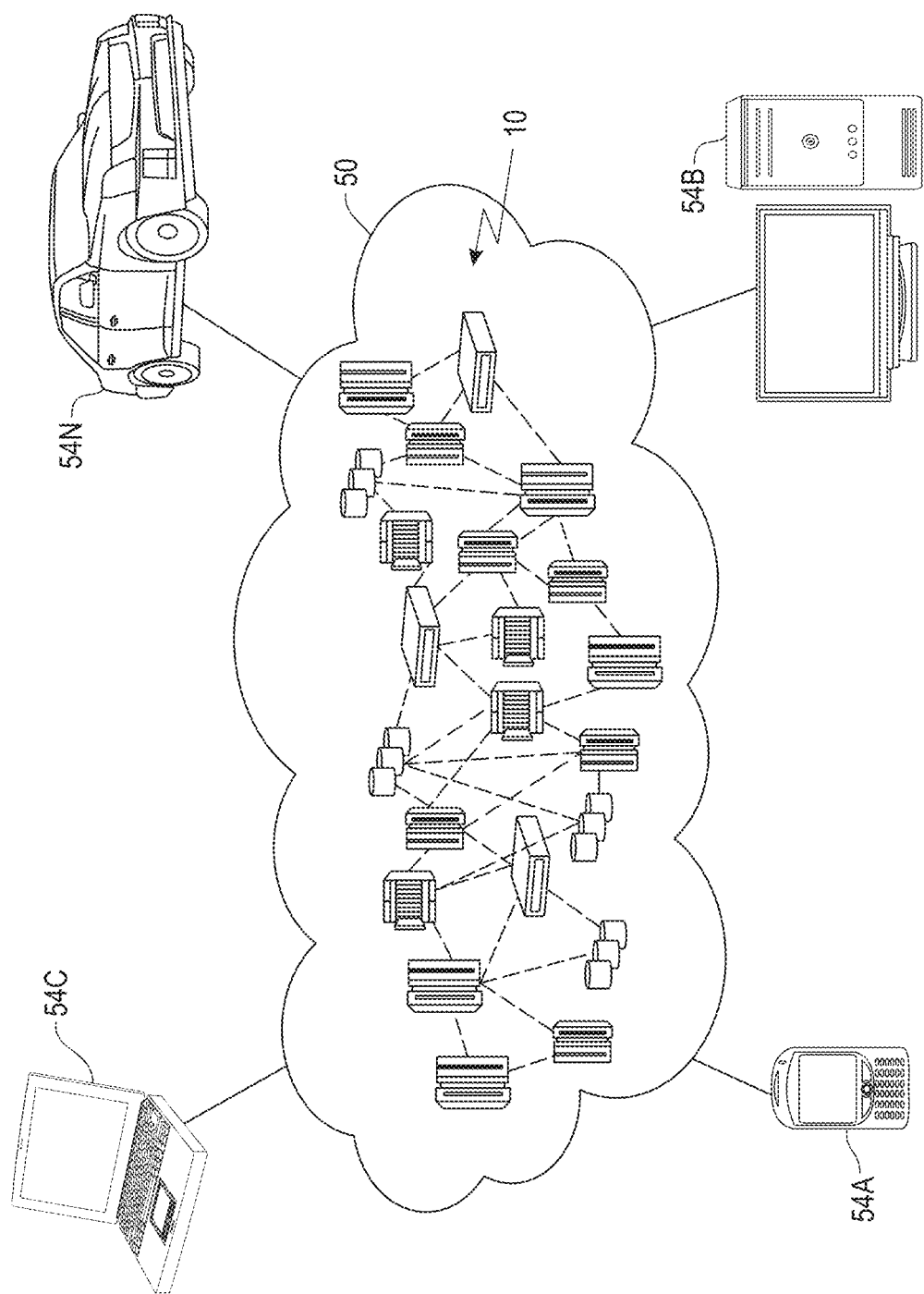
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Traditional business process management (BPM) is centered around a lifecycle involving (a) defining requirements for a repeating process, (b) designing a process model that embodies the requirements, (c) executing enactments of the process model multiple times, (d) monitoring the performance and results, and (e) optimizing and otherwise modifying the process model. A new approach is needed to meet the needs of BPM in the era of computing that is enabled at a fundamental level by Artificial Intelligence (including various forms of Cognitive Computing). One of the key drivers necessitating the new approach is that Cognitive Computing enables the automated understanding of large amounts of structured and unstructured data in a continuous fashion and on a large scale; as a result the information available to a given process enactment is continually expanding, making it impossible to create a comprehensive processing model in advance of the process enactments. The distinction between process "model" and process "enactment" (or "instance") is blurred, and in essence, each enactment of a process is based on a different process model. In one embodiment, each process enactment is based on numerous turns through a cycle of steps that involves (i) determining goals and/or subgoals and creating plans to achieve them (either wholly or partially), (ii) acting or executing on those plans for some period of time or until some objectives are achieved, and (iii) optionally, performing learning and analysis tasks to gain knowledge that can be incorporated into the subsequence cycle.

Embodiments relate to generating cognitive executable process graphs or code from a hybrid process knowledge graph. One embodiment provides for generating a cognitive executable process graph including obtaining, by a processor, a hybrid process knowledge graph generated based process fragments and a set of actionable statements and business constraints. The hybrid process knowledge graph including different node types. The hybrid knowledge graph is traversed from a root of a process through each task in the hybrid process knowledge graph to obtain an action and metadata for each task node. Based on the action and metadata, at least one statement in an equivalent executable code block is created to represent the action. A cognitive executable process graph is generated based on at least one executable code block.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
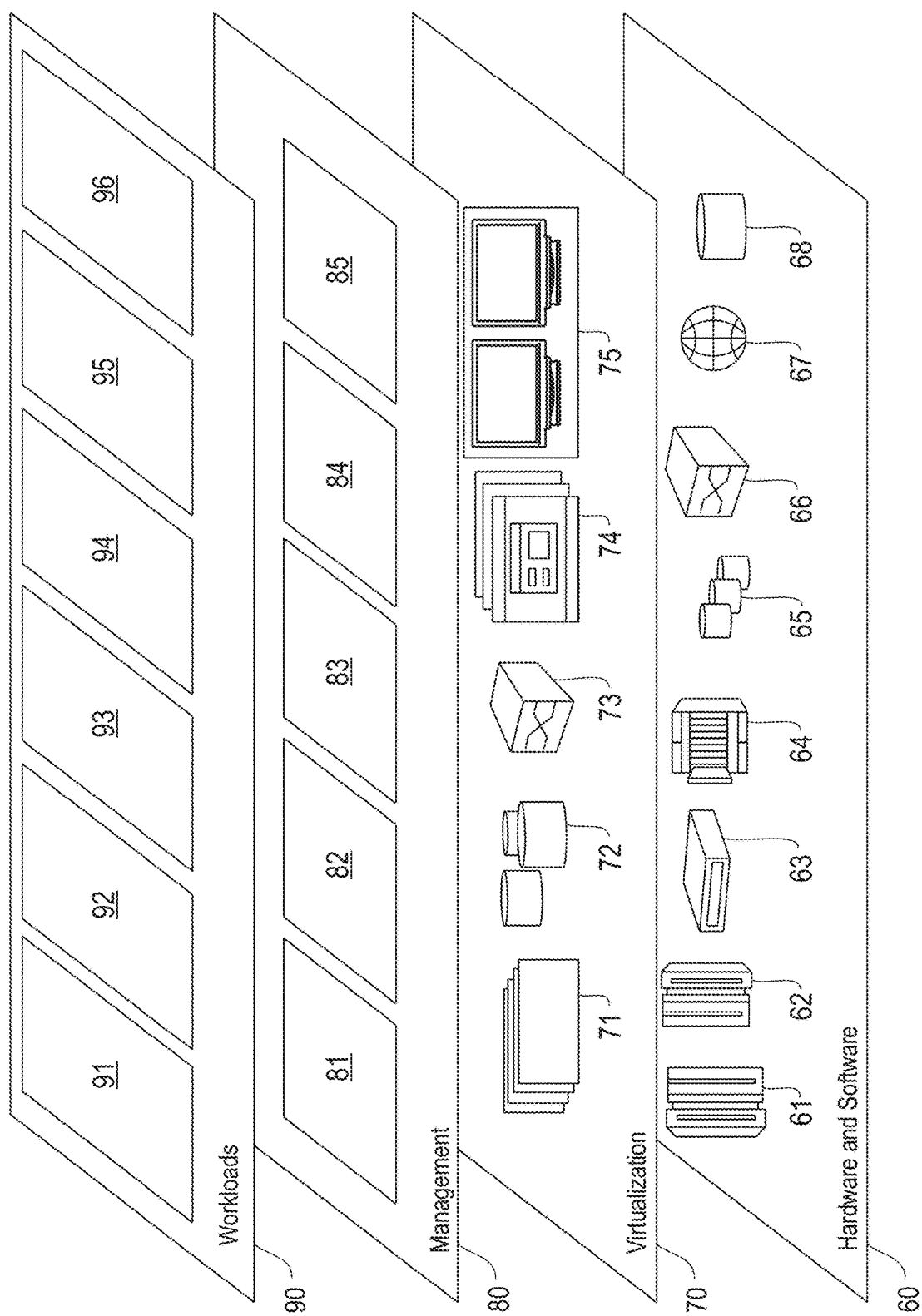
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and continuously adaptive business process management definition and execution processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
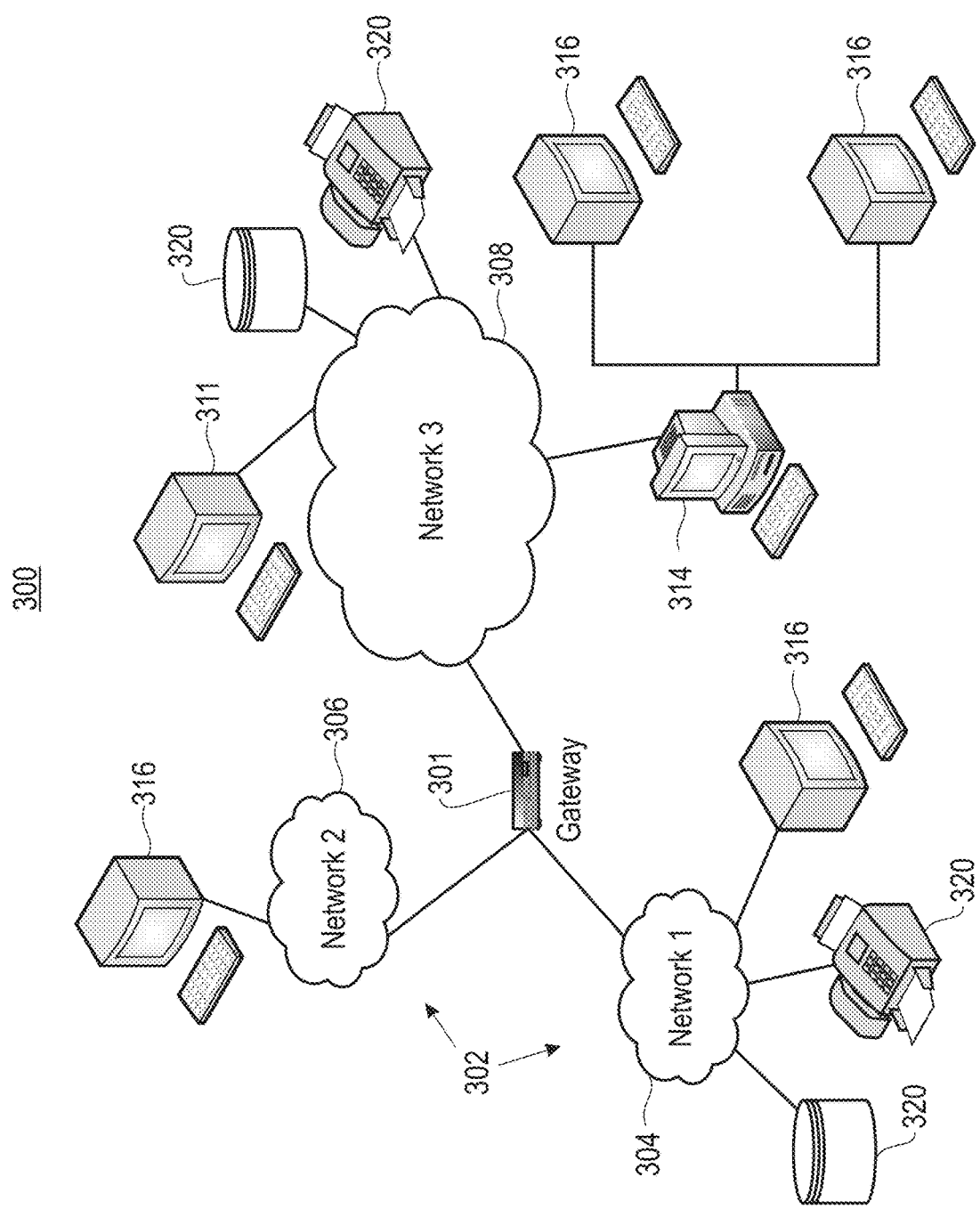
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
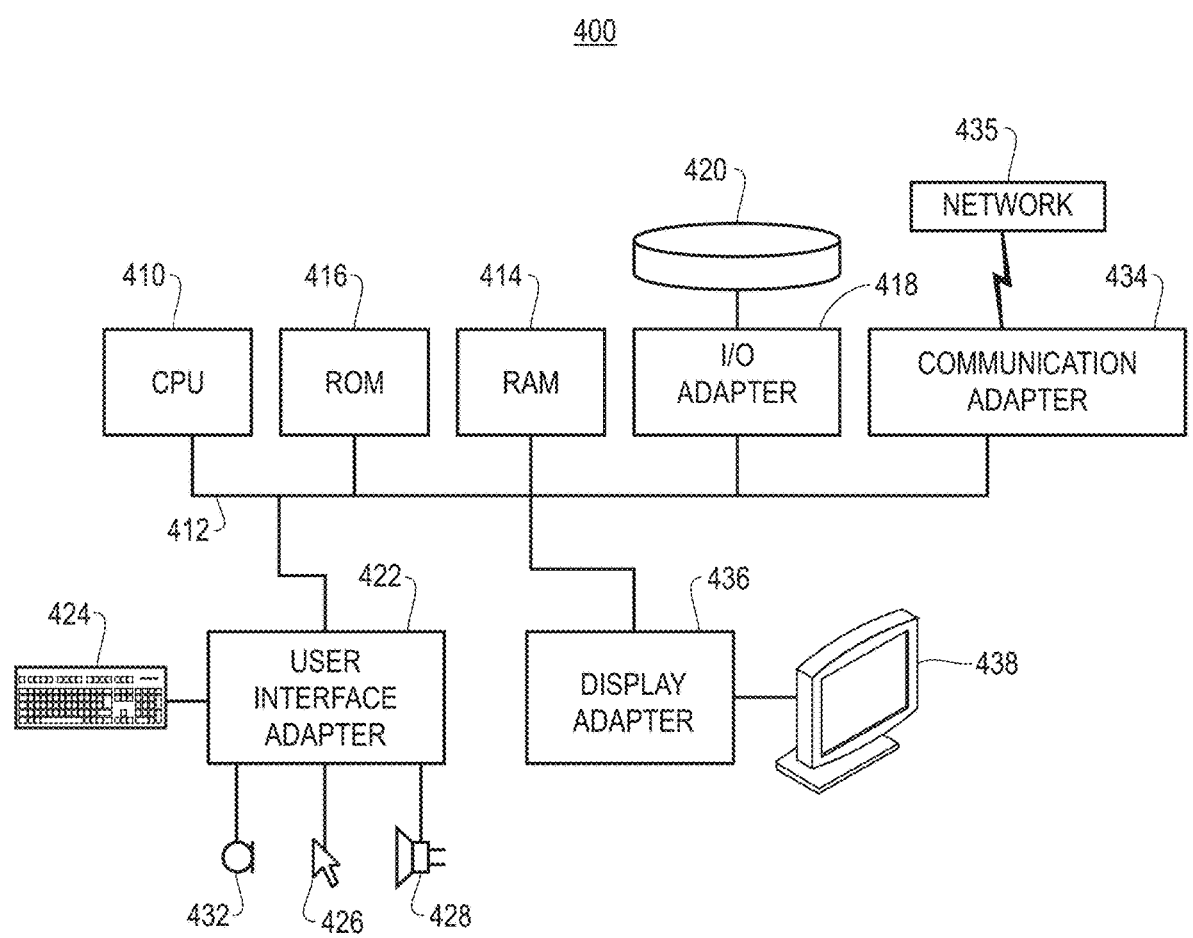
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
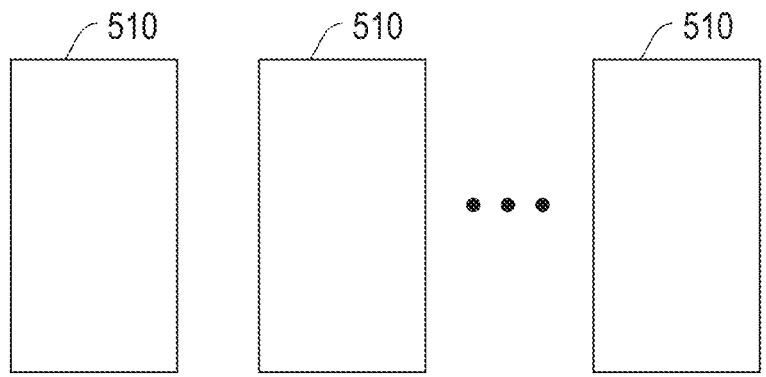
FIG. 5 is a block diagram illustrating system for continuously adaptive business process management definition and execution, according to one embodiment.
Figure 5:
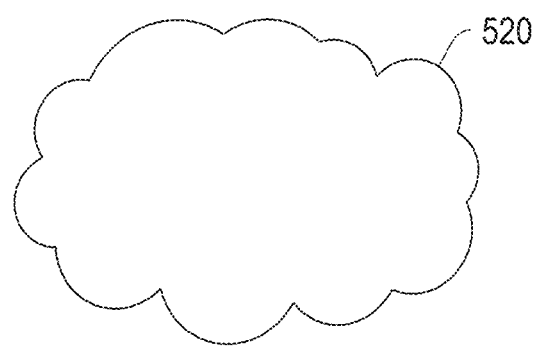
Figure 5:
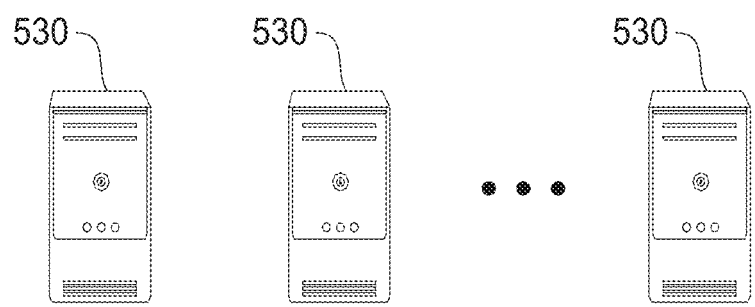

FIG. 5 is a block diagram illustrating a system 500 for continuously adaptive business process management definition and execution, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 models a business process as an enactable process knowledge graph, including relationships among the following key entities: knowledge, including constraints where knowledge at scale is the fundamentally new element that cognitive computing brings to business process management (BPM); goals/subgoals; initial top-level goals may be specified in advance, and additional goals and subgoals can be formulated dynamically; agents (human and machine); decisions that are made in the process, during specific process steps; actions, which are activities that are taken during the process enactment; plans where a plan is the specification of order of activities to take to achieve a specific goal/subgoal; and events that are happening in the environment, and trigger actions and decision. System 500 also provides continuously adaptive business process management definition and execution processing.

Unstructured information in a business process hierarchy may include a first tier of decision, design and strategy processes (e.g., for: enterprise, optimization (new business model, new markets, Geo's, etc.), merger/acquisition, build versus buy, etc.); judgment-intensive processes (sales of complex information technology (IT) services, project management (e.g., complex client on-boarding, etc.), commercial insurance underwriting, etc.); transaction-intensive processes (e.g., management of back-office processing (e.g., order-to-cash reconciliation, payroll, etc.)). Some challenges of the above-identified business process hierarchy include: for decision, design and strategy processes, due to rich flexibility needed, knowledge intensive processes are not supported systematically; a second tier may include judgment-intensive processes: many "Judgement-Intensive" processes are fairly simple, but highly variable and too expensive to automate; a third tier may include transaction-intensive processes: many "ancillary" processes are performed in ad hoc ways, spreadsheets, etc. One source of the aforementioned challenges is "dark data:" digital footprint of people, systems, apps and Internet of Things (IoT) devices. Handling and managing work (processes) involves interaction among employees, systems and devices. Interactions are occurring over email, chat, messaging apps, etc. There are descriptions of processes, procedures, policies, laws, rules, instructions, templates, schedules, regulations, applications, plans, and external entities such as customers, partners and government agencies, surrounding world, news, social networks, etc. The activities and interactions of people, systems, and IoT devices need to be coordinated. In one embodiment, generation of executable code from unstructured information is relevant to all three tiers of the hierarchy. If applied to tier three of the hierarchy then the generated process model would typically be focus on the "ancillary" processes, and would be based on conventional BPM approaches. If applied to tier two of the hierarchy, then the generated process may be a conventional business process model or a cognitively-enriched business process model. If applied to tier one of the hierarchy, then the generated process model would typically be a cognitively-enriched business process model. It should be noted that the core of many back-office processing solutions use transaction-based processing, and the ancillary processes have some characteristics of "Judgement-intensive" processing of tier two of the hierarchy.

In one example embodiment, values from automatic learning of processes includes the ability to automate, optimize, and transform "long tail" processes. Automation support for business processes is the long tail (graphically of volume versus different processes (e.g., routine, high volume processes to niche, low volume processes)).

Figure 6:
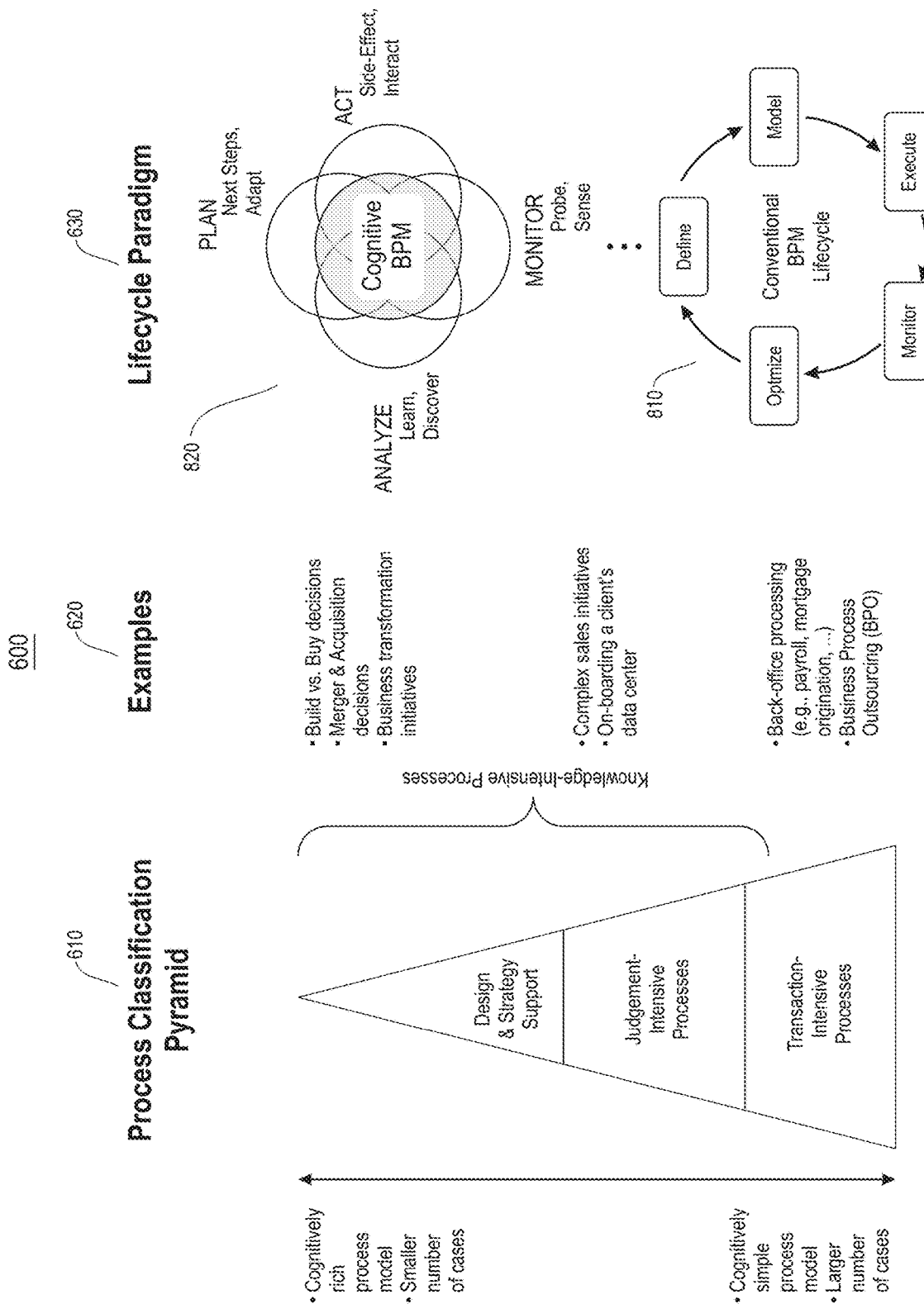
FIG. 6 illustrates a comparison of a process classification pyramid, examples and a lifecycle paradigm for moving from a conventional business process model lifecycle to a cognitive business process model, according to one embodiment.

FIG. 6 illustrates a comparison 600 of a process classification pyramid, examples and a lifecycle paradigm 630 for moving from a conventional business process model lifecycle to a cognitive business process model, according to one embodiment. The process classification pyramid 610 shows design and strategy support towards the top of the pyramid, judgment intensive processes in the middle of the pyramid and transaction intensive processes towards the bottom of the pyramid. As shown, from the middle to the top of the process classification pyramid 610 are knowledge-intensive processes. Towards the top of the process classification pyramid 610 would be targetable to a cognitively rich process model and smaller number of cases; and towards the bottom of the process classification pyramid 610 would be targeted to a cognitively simple process model and larger number of cases.

The examples 620 listed near the top include: build versus buy decisions; merger and acquisition decisions; and business transformation initiatives. The examples 620 listed near the middle include: complex sales initiatives; and on-boarding a client's data center. The examples 620 listed near the bottom include: back-office processing (e.g., payroll, mortgage origination, etc.); and business process outsourcing (BPO). The right-side of the comparison 600 includes the lifecycle paradigm 630 including the conventional BPM 810 (FIG. 8) on the bottom and the cognitive BPM 820 (FIG. 8) on the top.

Figure 7:
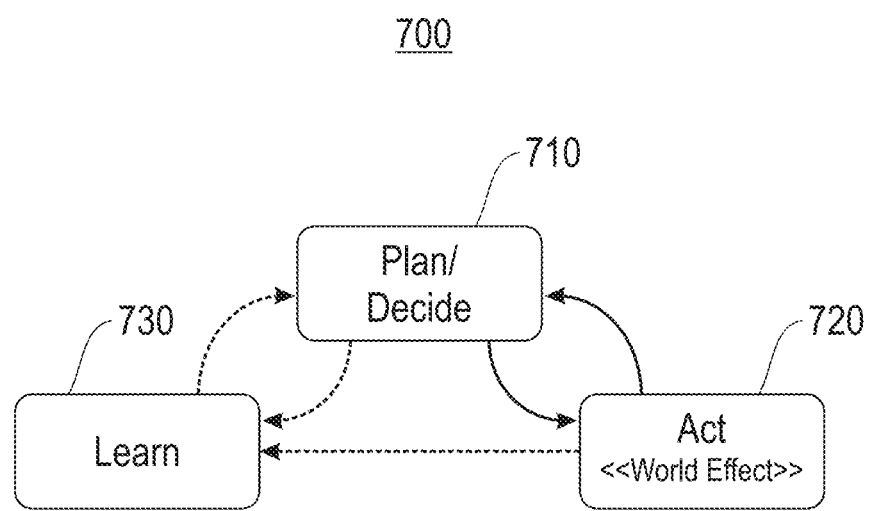
FIG. 7 illustrates extending a plan-act-learn cycle for cognitively-enabled processes, according to one embodiment.
Figure 9:
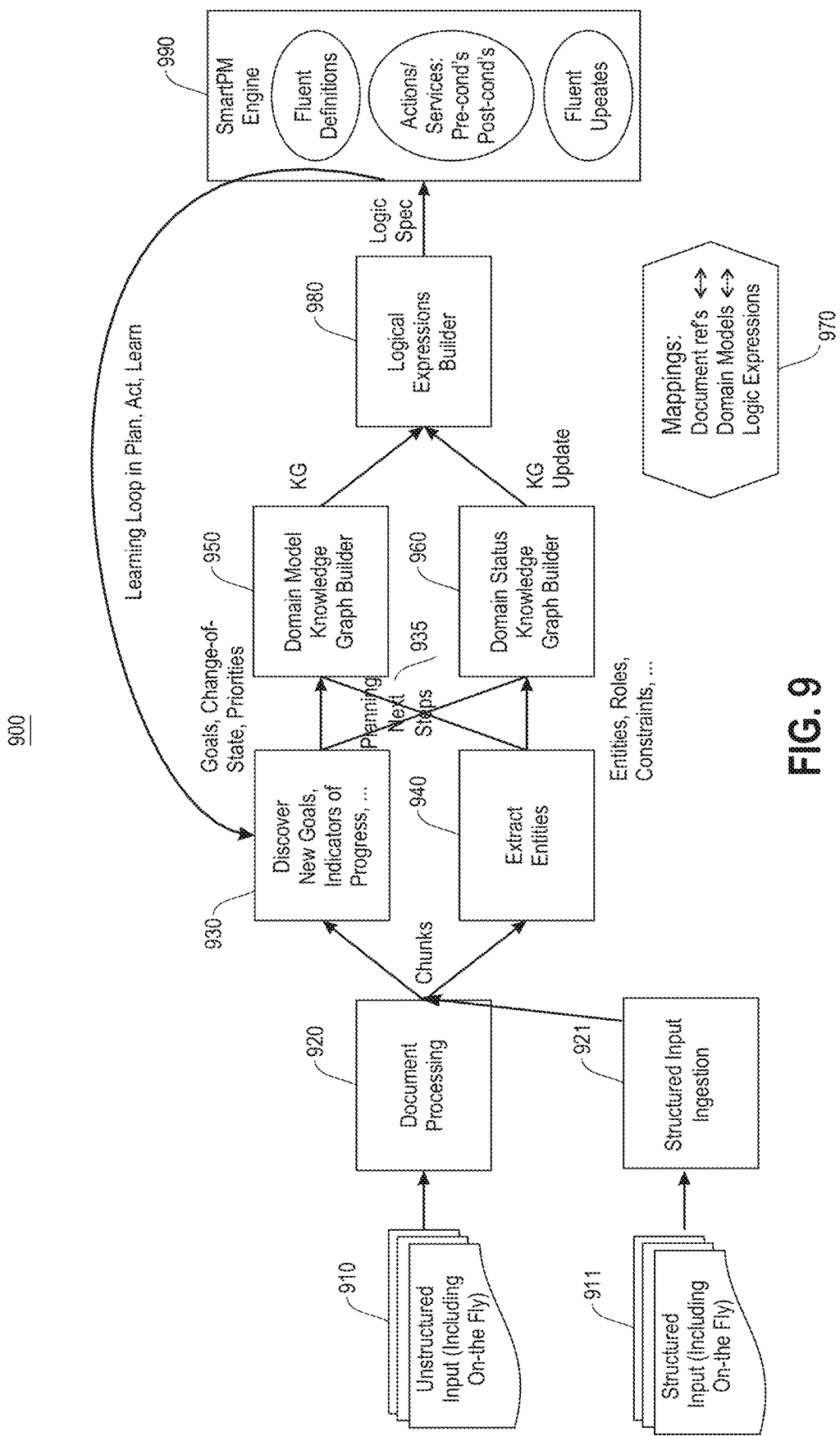
FIG. 9 illustrates an example pipeline for a plan, act and learn model in a continuously adaptive process enactment approach, according to one embodiment.

FIG. 7 illustrates extending a plan-act-learn cycle 700 for cognitively-enabled processes, according to one embodiment. The plan-act-learn cycle 700 includes plan/decide processing 710, act processing 720 and learn processing 730. In one embodiment, the plan-act-learn cycle 700 modifies the Define-Execute-Analyze-Improve cycle from conventional business process model to the plan-act-learn cycle 700 of the process lifecycle of the plan, act and learn model in a continuously adaptive process enactment approach 900 (FIG. 9). In one embodiment, for each enactment of the overall process, many iterations around the plan-act-learn cycle 700 loop are performed. At a given time, multiple goals and sub-goals may be active including: numerous processing threads of activity, and each processing thread is modeled essentially as a "case" as in Case Management. In one example, as new information arrives the plan-act-learn cycle 700 may re-start for some or all processing threads including: planning based on new information (new goal formulation, planning to achieve those goals, etc.), act on next steps of plan by the act processing 720, and optionally perform learning steps by the learn processing 730. In one embodiment, a "Cognitive Agent" process assists by: performs the planning, learns from large volumes of structured/unstructured data, over time, and learns the best practices and incorporates into the planning.

Figure 8:
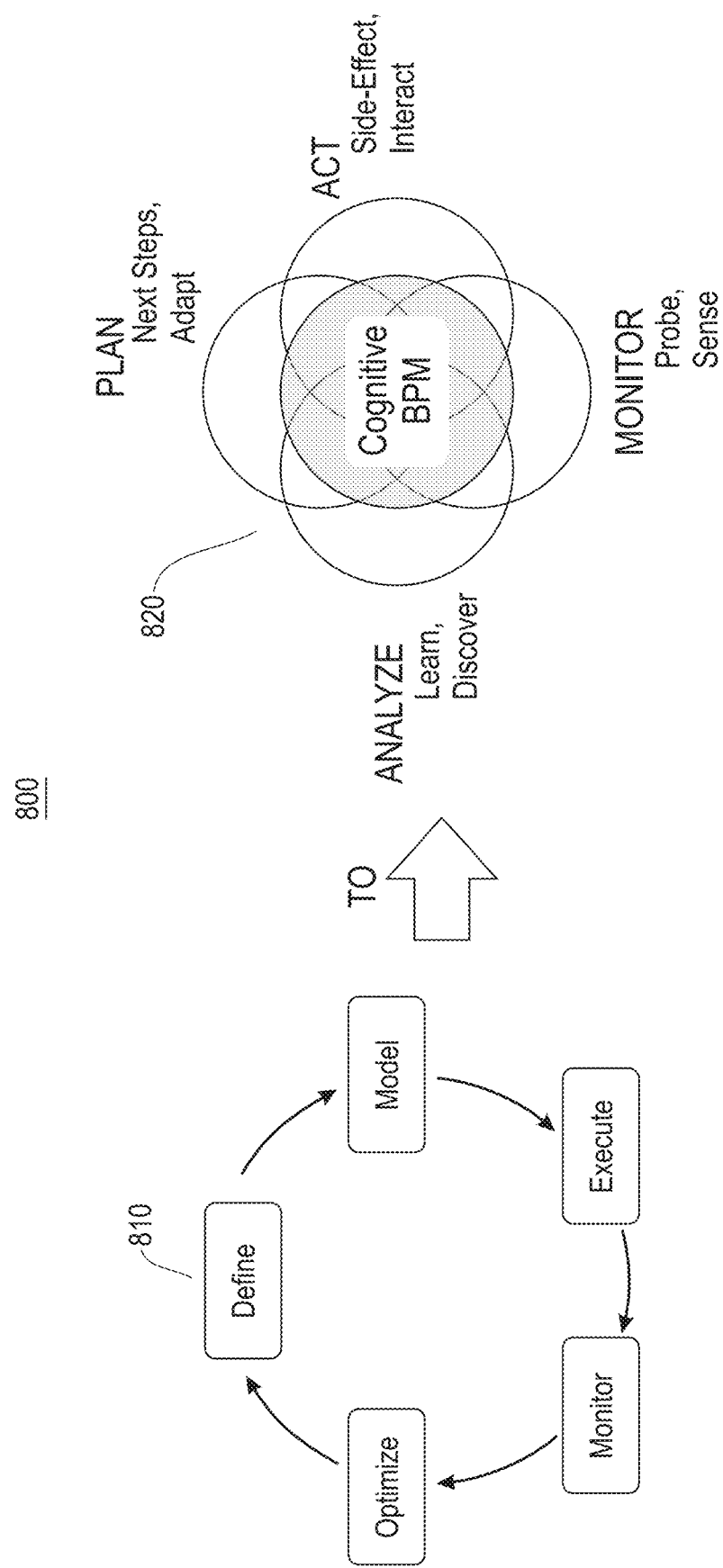
FIG. 8 illustrates an example of comparing the conventional business process model lifecycle to a cognitive business process model, according to one embodiment.

FIG. 8 illustrates an example 800 of comparing the conventional business process model lifecycle to a cognitive business process model, according to one embodiment. The conventional business PM (BPM) 810 includes processing for define, model, execute, monitor and optimize. The cognitive BPM 820 includes processing for: analyze (learn discover), plan (next steps, adapt), act (side-effect, interact), and monitor (probe, sense). The transition from conventional BPM to Cognitive BPM is an example of a "disruption" or paradigm shift in Computer Science and Information Technology (IT). This disruption is in some ways analogous to previous disruptions including, the shift from conventional distributed information management to web-based information sharing; the shift from conventional object-oriented programming to REST API based and Software-as-a-Service based programming; and the shift from traditional data centers to cloud-hosted computing.

FIG. 9 illustrates an example pipeline 900 for a plan, act and learn model in a continuously adaptive process enactment approach, according to one embodiment. The example pipeline 900 includes processing that includes: input of unstructured information 910 (including receiving/obtaining information on-the-fly), structured input/data (including receiving/obtaining information on-the-fly), document processing 920, structured input ingestion 921, discover processing 930 for new goals, indicators of progress, external information that is relevant to a given process enactment, etc., extract entities 940 processing (for example, Stanford natural language parser, etc.), planning next steps 935, domain model knowledge graph builder 950, domain status knowledge graph builder 960, mappings 970, and logical expressions builder 980, which outputs logic specification(s) to a smart processing model (PM) engine 990 (which includes fluent definitions, actions/services, pre-conditions, post-conditions, fluent updates, etc.). In one embodiment, the learning loop in plan, act and learn flows from the output of the logic expressions builder 980 to the smart PM engine 990 to the discover processing 930.

In one embodiment, the document processing 920 results in chunks being fed into the discover process 930 processing and the extract entities 940 processing. The output of the discover process 930 processing may include goals, change-of-state, priorities, etc. The output of the extract entities 940 processing may include entities, roles, constraints, etc. The output of the domain model knowledge graph builder 950 may include a knowledge graph. The output of the domain status knowledge graph builder 960 may include a knowledge graph update.

In one embodiment, the document processing 920 assists in understanding macro-structure of input documents including sections/subsections, list and table layouts, meta-rules, etc. The extract business entities 940 processing extracts domain model building blocks that may include sections/subsections, list and table layouts, meta-rules, etc. The discover process fragments 930 processing extracts process constructs that may include conditions, actionable statements, sequences, scoping, etc. The mappings 970 processing includes mapping of: document references, domain models, database references, etc. The mapping 970 processing includes a mapping construction algorithm that is self-tuning. The process domain status knowledge graph builder 960 constructs an all-inclusive knowledge graph including a parse-tree for process fragments. In one example embodiment, a targeted domain model is created from the mappings 970 that may include, for example, employee attributes, as occurring in different data sources, different kinds of updates, etc.

Figure 10:
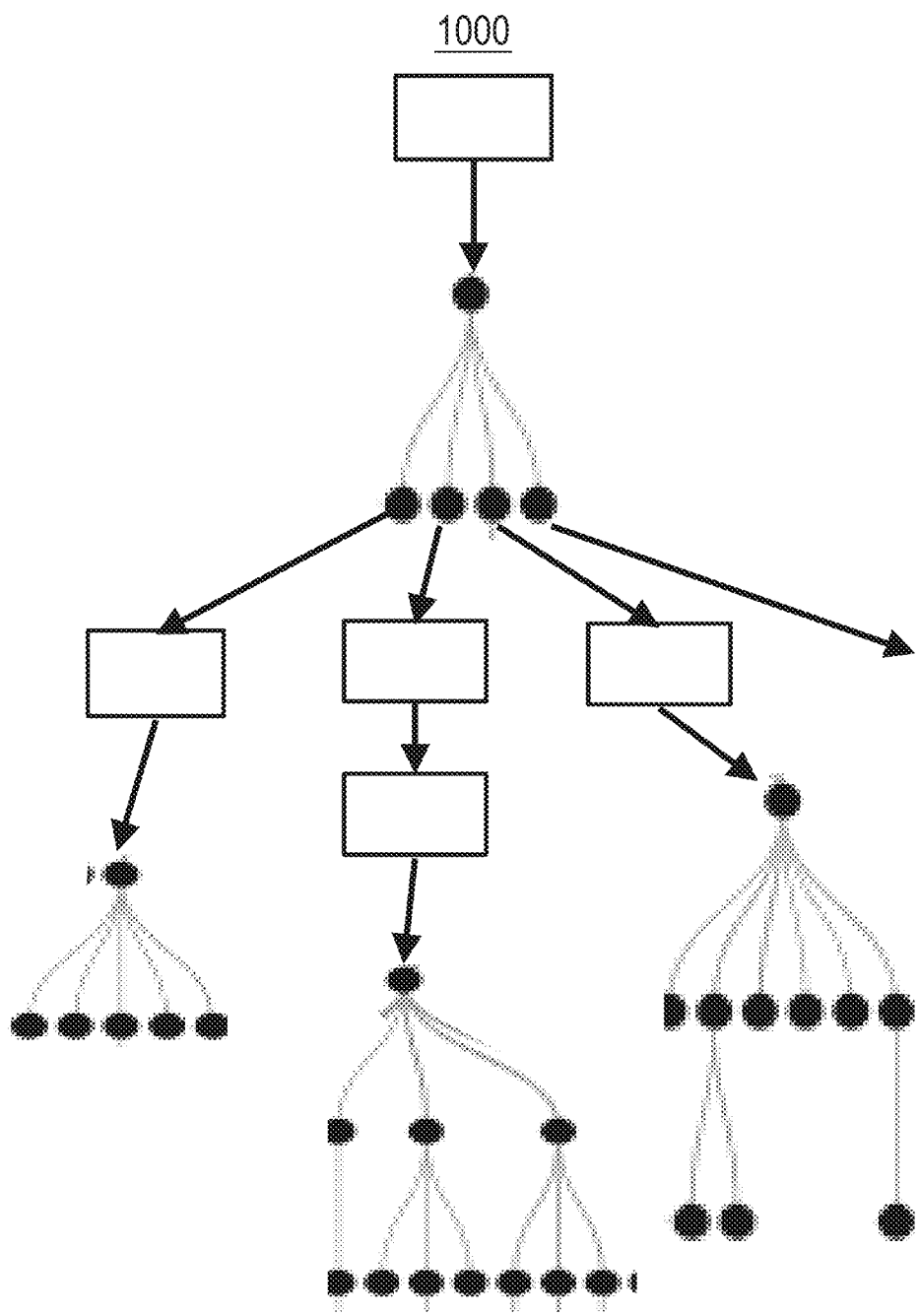
FIG. 10 illustrates an example hybrid decision tree formed from learned logic, according to one embodiment.

FIG. 10 illustrates an example 1000 hybrid decision tree formed from learned logic, according to one embodiment. The example 1000 hybrid decision tree may be generated based on rules, guidelines, eligibility criteria, limits, etc. In one embodiment, the example 1000 hybrid decision tree may represent a process model that may be a cognitive process model that comprises a hybrid collection of knowledge graphs of process fragments in which each node in the graph can be of different types. The different types for each node may include actions that are connected to other actions, with different relationships types (dependencies, hard and soft constraints), link to different entities in the space of that the action is operating on, pre-conditions and post-conditions of the action execution (optionally), and links to other systems, bots, and people (with different roles and responsibilities). In one embodiment, the example 1000 hybrid decision tree, after each execution, may be updated (e.g., nodes added, changed or deleted) based on the changes in the environment.

Figure 11:
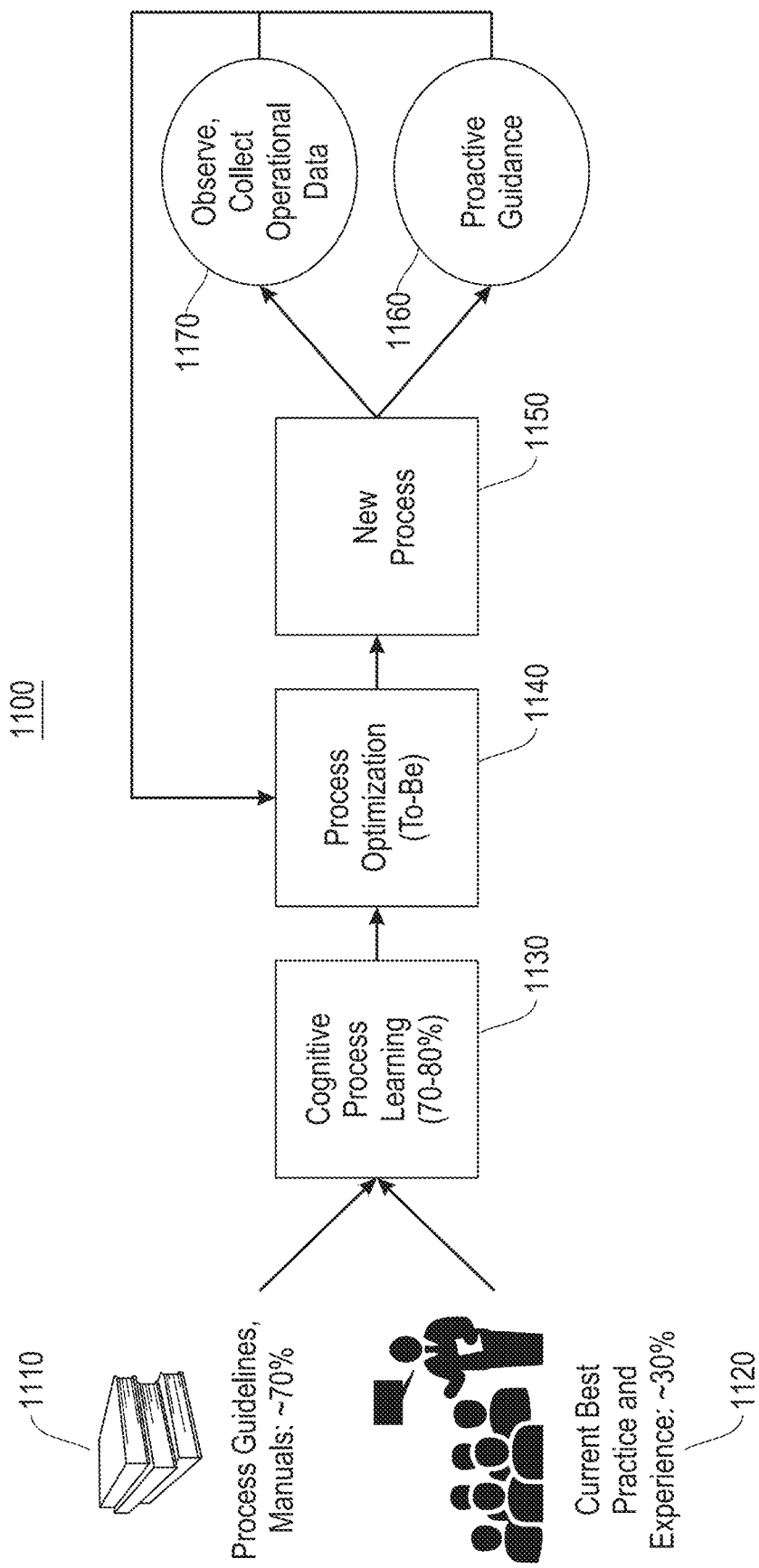
FIG. 11 illustrates an example of how the cognitive BPM approach might be used in the context of continuously adaptive business process operation in the cognitive world, according to one embodiment.

FIG. 11 illustrates an example 1100 of how the Cognitive BPM approach might be used in the context of continuously adaptive business process operation in the cognitive world, according to one embodiment. The example 1100 inputs process guidelines and manuals 1110 (about 70%) and current best practice and experience 1120 (about 30%) in an application area, such as commercial insurance underwriting. An approach based on cognitive process learning 1130 can be used to learn about 70-80% of the processing logic, and to create executable rules and actionable statements corresponding to that logic. This is sufficient to deploy an initial processing framework and to execute 1150 enactments of the process. There may be significant human involvement in the process executions given that only 70% of the processing logic is learned from the process guidelines and manuals. As part of the ongoing processing of enactments, the system may generate proactive guidance 1160 to users who are performing manual tasks, including complex decision-making tasks. Once processing of enactments has commenced, then operational data 1170 and proactive guidance 1160. The observe and collect operational data is observed and collected 1170 and proactive guidance 1160 are fed back to the process optimization 1140 processing, to enable continuous process improvements. The actual processing 1150 is based on the plan-act-learn cycle 700 (FIG. 7). This needed in part because the succeeding process enactments will take advantage of the optimizations 1140 created over time, and so a fixed process model cannot be created for this process in advance.

Figure 12:
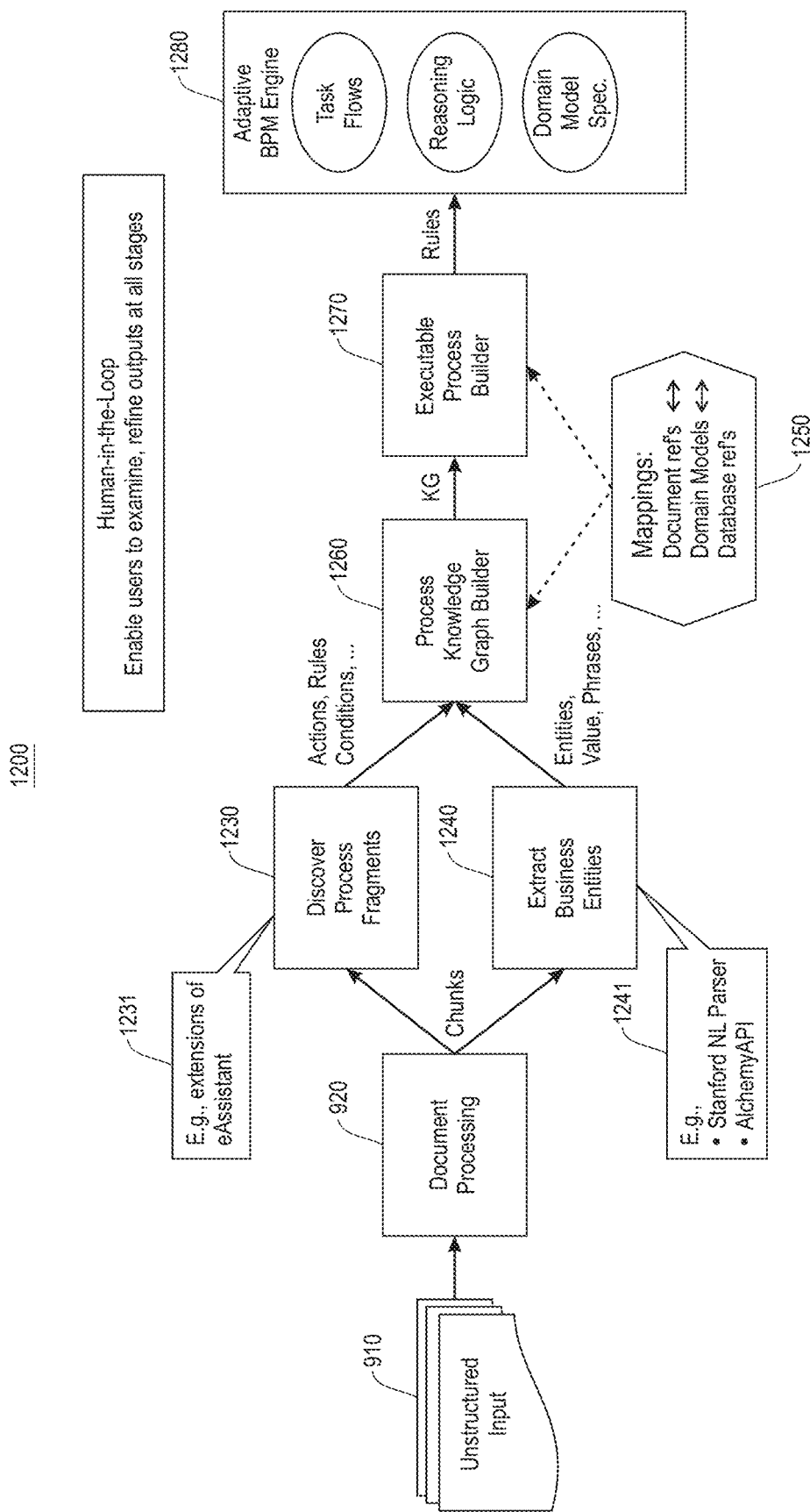
FIG. 12 illustrates an example pipeline for a generic framework for mapping from unstructured process information into executables, according to one embodiment.

FIG. 12 illustrates an example pipeline 1200 for a generic framework for mapping from unstructured process information into executables, according to one embodiment. In one embodiment, the pipeline 1200 includes unstructured (information) input 910 (FIG. 9), document processing 920 (FIG.

9), process knowledge graph builder 1060 and executable process builder 1270. In one embodiment, the output of the executable process builder 1270 includes rules that may be fed into an adaptive BPM engine 1280 (which includes task flows, reasoning logic and domain model specification).

In one example embodiment, example 1231 are included in the discover process fragments 1230 processing. The document processing 920 results in chunks being fed into the discover process fragments 1230 processing and the extract business entities 1240 processing. The output of the discover process fragments 1230 processing may include actions, rules, conditions, etc. The output of the extract business entities 1240 processing may include entities, value phrases, etc. The output of the process knowledge graph builder 1260 may include a knowledge graph. In one embodiment, a human-in-the-loop may enable users to examine and refine outputs at all stages of the pipeline 1200.

In one embodiment, the document processing 920 assists in understanding macro-structure of input documents including sections/subsections, list and table layouts, meta-rules, etc. The extract business entities 1240 processing extracts domain model building blocks that may include sections/subsections, list and table layouts, meta-rules, etc. The discover process fragments 1230 processing extracts process constructs that may include conditions, actionable statements, sequences, scoping, etc. The mappings 1250 processing includes mapping of: document references, domain models, database references, etc. The mappings 1250 processing includes a mapping construction algorithm, which is self-tuning as other parts of example pipeline 1200. The process knowledge graph builder 1260 constructs an all-inclusive knowledge graph including a parse-tree for process fragments. The executable process builder 1270 includes human-consumable abstract representation of executable, such as templates corresponding to conditions, actions, conditional actions, etc.

In one example embodiment, a targeted domain model is created from the mappings 1250 that may include, for example, employee attributes, as occurring in different data sources, different kinds of updates, etc. The adaptive BPM engine 1280 may create a targeted processing model, for example, for HR processing the focus is on the individual employees, and for validating input data values, series of updates if valid, manual treatment of exceptions, etc.

In one embodiment, the process knowledge graph builder 1260 includes the following extraction guidelines and notes, according to one embodiment. While processing a document, a first question is identification of process fragment boundary (where a process fragment starts, and when it ends). Detection of a block of actions in a list, in a paragraph, or section signals identification of candidate process fragment. The process names may be deduced from section headers, or any heading of the text of paragraph that contain the process fragment. In one embodiment, joining actionable statement with entity information is processed using the following. When joining the eAssistant actionable statement information with entities from a cognitive computing API, use the sentence boundary to identify whether an entity is in the theme of the action (ActionAPI also may be used for this purpose). In identification of the entity and action relationship, the syntactic role of the entity is used (whether object, in subject, etc.).

In one embodiment, mapping from process descriptions to executables may include, for example: for document processing 920, insurance manuals focus on types of companies and have long lists of if-then-else rules, exclusions, etc. Discover process fragments 1230 processes constructs mainly around rules that define a decision tree. The extract business entities 1240 processing extracts domain model building blocks. The process knowledge graph builder 1260 processing generates a knowledge graph that includes meta-rules, e.g., regarding treatment of exclusions. The mappings 1250 processing may include look-up tables used by authors of manuals in a mapping construction algorithm/process.

In one embodiment, key process constructs to pull from a DTP/JobAid for BP-specific may include:
concept reference (e.g., employee, pay slip, termination, computation, country), and applications to interact with (SAP, PeopleSoft, Spreadsheets, . . . ), and temporal concepts; actions: access data—from where, what fields, what time range; output/write data—to where, what fields, what format; obtain approval, e.g., from a Team Lead, or sometimes from a peer practitioner; and mitigate inconsistency, typically by sending an email or calling someone;
conditional action, e.g., for all countries (or other category) vs. action for a single country;
macro level: identify the reasoning processes (access, reason, record); identify sequencing between reasoning processes; note: the focus on the reasoning processes is: kinds of "reasoning," computation steps: as for tax computation, actually, the logic here may be buried inside spreadsheet macros; validation steps: typically comparing values from corresponding fields from different data sources. Picking out the field-name-pairs is useful; "root cause" analysis steps: e.g., individual ways that a PACT flag can be explained, e.g., increase pay might be from a bonus, a raise, end of a garnishment, etc.

In one embodiment, key process constructs to pull from a DTP/JobAid for App-specific may include: key conceptual entities, e.g., employee, Pay Slip, Termination, Wage Type (there are several kinds), Benefits, Tax computation, Government agencies, Key documents to be created (e.g., "attestation" for French sickness), etc.; Set of relevant countries; Set of relevant Applications, including data objects (e.g., SAP Info Types, Wage types, government web sites), for each Info Type, set of relevant field names; key triggering events, e.g., request from Team Lead, Incoming Sickness information from client company, Reimbursement payment from a government entity, etc.

In one example embodiment, key process entities for an example HR Case may include: process fragment: Name, Triggering Condition, {Include Link to a set of Actions}; Action: verb, Role/Person, Deadline (specific date), Timeline (a time/period mention), Data/Attribute/Business Entity; Goal/Objective: description of what is desired to be achieved, e.g., termination of an employee; Conditions/Rules: Examples: "if . . . then else," " . . . . Unless . . . "; Conditions/Rules have antidendent and consequent sections; the antidendent part is a logical statement; consequent sections contain one or more Actions; Action Flow: assigning a sequence number to each action in the process fragment.

In one embodiment, process knowledge graph builder 1260 includes the following extraction guidelines and notes, according to one embodiment. While processing a document, a first question is identification of a process fragment boundary (where a process fragment starts, and when it ends). Detection of a block of actions in a list, in a paragraph, or section signals identification of candidate process fragment. The process names may be deduced from section headers, or any heading of the text of paragraph that contain the process fragment. In one embodiment, joining actionable statement with entity information is processed using the following. When joining the eAssistant actionable statement information with entities from a cognitive computing API, use the sentence boundary to identify whether an entity is in the theme of the action (ActionAPI also may be used for this purpose). In identification of the entity and action relationship, the syntactic role of the entity is used (whether object, in subject, etc.).

In one embodiment, the pipeline 1200 may include hybrid rule-process models. An insurance process is dominated by traversing parts of a large, very wide, virtual decision tree (or directed acyclic graph (DAG)). The hybrid rule-process models may be driven by a large set of rules, that may evolve over time. Traditional separation of "process model" and "process instance" is not a good fit. Key requirements on a "new" modeling approach may include: repeatability/consistency (until rules are modified), points of uniformity to enable reporting, both operational efficiency and business-level rationale and optimizations, and traceability/provenance for each case in a standardized way to keep all relevant data and rules applied. In one embodiment, a hypothesis may include: for the rules-driven aspects: data-centric model—similar to case management; lifecycles: hybrid of process+decision tree, where a decision tree may be a DAG with roll-backs; identify shared milestones to enable comparisons across cases; and maintain database of rules, with history of updates to them.

In one embodiment, mapping from process descriptions to executables may include, for example: for document processing 920, insurance manuals focus on types of companies and have long lists of if-then-else rules, exclusions, etc. Discover process fragments 1230 processing processes constructs mainly around rules that define a decision tree. The extract business entities 1240 processing extracts domain model building blocks. The process knowledge graph builder 1260 processing generates a knowledge graph that includes meta-rules, e.g., regarding treatment of exclusions. The mappings 1250 processing may include look-up tables used by authors of manuals in a mapping construction algorithm/process. The executable process builder 1270 includes human-consumable abstract representation of executables.

Figure 13:
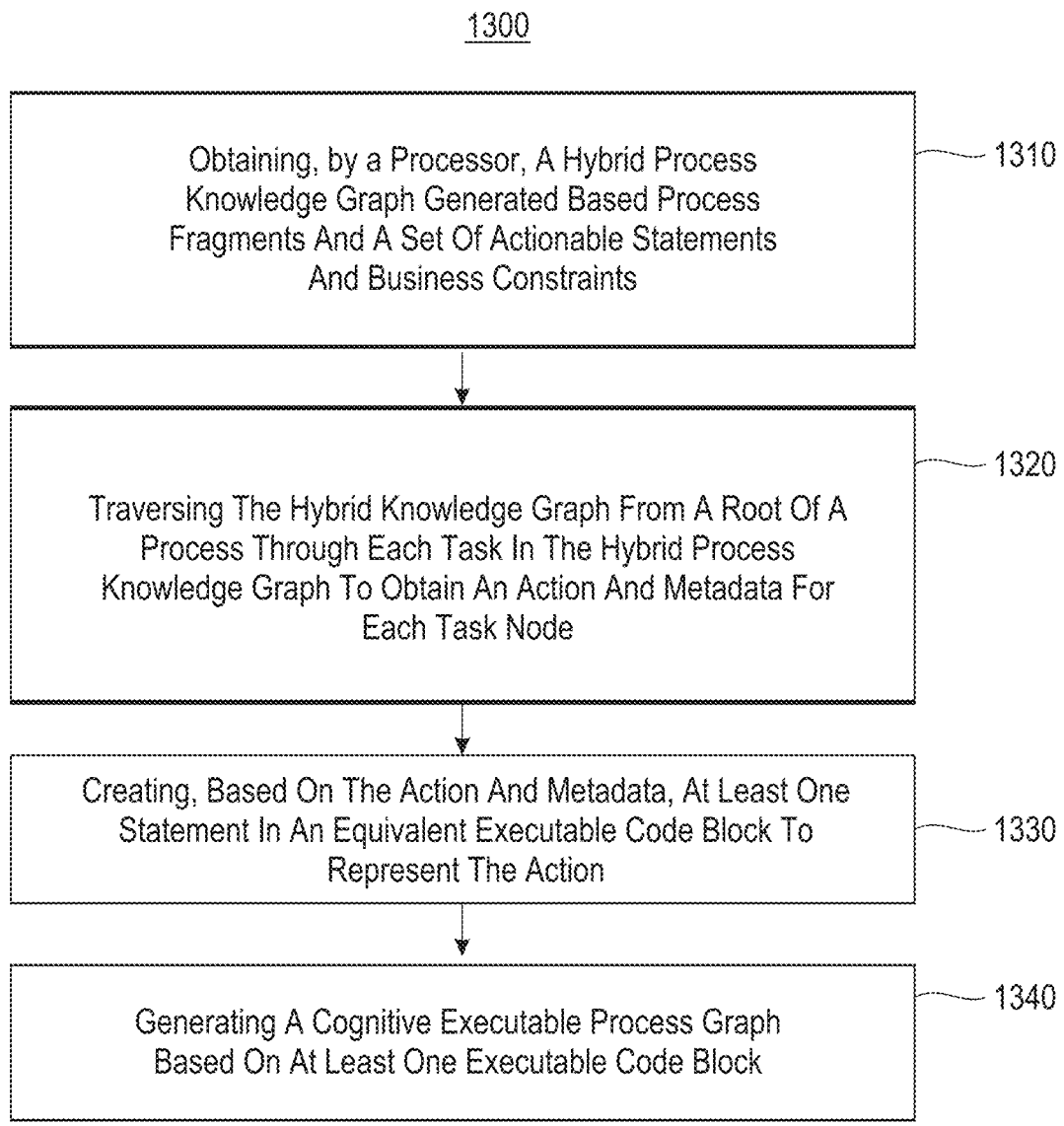
FIG. 13 illustrates a block diagram for a process for generating a cognitive executable process graph from a hybrid process knowledge graph, according to one embodiment.

FIG. 13 illustrates a block diagram for a process 1300 for generating a cognitive executable process graph from a hybrid process knowledge graph, according to one embodiment. In block 1310, process 1300 obtains, by a processor (e.g., a processor in cloud computing environment 50, FIG. 1, system 300, FIG. 3, system 400, FIG. 4, or system 500, FIG. 5), a hybrid process knowledge graph generated based process fragments and a set of actionable statements and business constraints. In one embodiment, the hybrid process knowledge graph includes different node types. In block 1320, process 1300 traverses the hybrid knowledge graph from a root of a process through each task in the hybrid process knowledge graph to obtain an action and metadata for each task node. In block 1330 process 1300, based on the action and metadata, at least one statement in an equivalent executable code block is created to represent the action. In block 1340 process 1300 generates a cognitive executable process graph based on at least one executable code block.

In one embodiment, in process 1300 creating in block 1330 further includes processing a link between tasks while considering relationships between tasks to arrange corresponding executable code blocks. In one embodiment, in process 1300 executable code logic is created considering sequential, nested, and loop control flows in the executable process code that is equivalent to the cognitive executable process graph. The cognitive executable process graph is enriched by adding logical terms and semi-formal statements of commands based on natural language. The cognitive executable process graph is cognitively interpreted by a process enactment processor at execution time.

In one embodiment, in process 1300 the cognitive executable process graph comprises a programming language or a formal process specification language. In one embodiment, in process 1300 executable code of the cognitive executable process graph is generated from a template, and related placeholders in the template are filled based on action information in the hybrid process knowledge graph. The template may include different executable blocks for different actions.

In one embodiment, in process 1300 process fragments are hierarchical, and a process fragment comprises information on at least one of execution order and precedence of sub-process fragments. In one embodiment, in process 1300 a process fragment further includes at least one of an action, a condition and a rule, and the process comprises an action flow that defines order precedence of actions or rules in a process fragment. In one embodiment, all attributes of an action are linked to the action with at least one link.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a cognitive executable process graph, comprising:

receiving, by a processor, a hybrid process knowledge graph from a computer process that generates the hybrid process knowledge graph based on a collection of process fragments and a set of actionable statements and business constraints, the process fragments identified from unstructured information by the processor determining process boundaries, the set of actionable statements and business constraints, the hybrid process knowledge graph including different node types comprising actions that are connected to other actions, and actions with different relationship types;

generating, by the processor, process knowledge graphs based on the process fragments and the set of actionable statements and business constraints;

performing, by the processor, processing of at least one hybrid rule-process model that includes a hybrid collection of the knowledge graphs, the processing obtains an action and metadata for each task node by traversing the hybrid process knowledge graph from a root of an executable process through each task in the hybrid process knowledge graph and learning processing logic from the hybrid rule process model;

creating, by the processor, using the learned processing logic, the action and metadata, executable rules and at least one actionable statement in an equivalent executable code block to represent the action;

mapping, by the processor, the unstructured information to executables that include the executable rules, the mapping includes processing of look-up tables that are used by authors of manuals in a mapping construction process, and mappings include attributes; and generating, by the processor, a cognitive executable process graph using a targeted domain model created from the mappings and at least one executable code block based on extraction of domain model building blocks and processed constructs around rules defining a decision tree, wherein the cognitive executable process is interpreted by the processor at execution time.

2. The method of claim 1, wherein:

creating further comprises processing a link between tasks while considering relationships between tasks to arrange corresponding executable code blocks;

the different node types further comprise links to different entities in a space of that an action is operating on, and links to other systems, bots and individuals that have different roles and responsibilities;

an action comprises a task action to be performed;

the different relationship types are based on dependencies and constraints; and the processed constructs may include concept reference, applications to interact with, and actions for accessing data.

3. The method of claim 2, wherein executable code logic is created considering sequential, nested, and loop control flows in code of the executable process that is equivalent to the cognitive executable process graph, the cognitive executable process graph is enriched by adding logical terms and semi-formal statements of commands based on natural language, and the processed constructs further include key conceptual entities, key documents and a set of relevant applications including data objects.

4. The method of claim 1, further comprising:

obtaining, by the processor, document information from document processing of unstructured data source information;

generating, by the processor, a text representation model based on the unstructured data source information;

extracting, by the processor, the set of actionable statements and business constraints from text from the text representation model; and for each actionable statement, extracting, by the processor, business entities and the metadata;

wherein the cognitive executable process graph comprises a formal process specification language, the mapping uses a self-tuning mapping construction algorithm, and the metadata is related to the actionable statements.

5. The method of claim 1, wherein executable code of the cognitive executable process graph is generated from a template, related placeholders in the template are filled based on action information in the hybrid process knowledge graph, and the attributes occur in different data sources.

6. The method of claim 5, wherein the template comprises different executable blocks for different actions, and the generated knowledge graph includes meta-rules for treatment of exclusions.

7. The method of claim 1, further comprising:

detecting, by the processor, a block of actions in a list to signal identification of a candidate process fragment;

wherein process fragments are hierarchical, and a process fragment comprises information on execution order and precedence of sub-process fragments.

8. The method of claim 6, wherein a process fragment further comprises an action, a condition and a rule, and the process comprises an action flow that defines order precedence of actions or rules in a process fragment.

9. The method of claim 7, wherein all attributes of an action are linked to the action with at least one link.

10. A computer program product for generating a cognitive executable process graph, the computer program product comprising a non-transitory computer readable storage medium having program instructions embodied therewith, the program instructions executable by a processor to cause the processor to:

receive, by the processor, document information from document processing of unstructured data source information;

receive, by the processor, a hybrid process knowledge graph from a computer process that generates the hybrid process knowledge graph based on a collection of process fragments and a set of actionable statements and business constraints, the process fragments identified from unstructured information by the processor determining process boundaries, the set of actionable statements and business constraints, the hybrid process knowledge graph including different node types comprising actions that are connected to other actions, and actions with different relationship types;

generate, by the processor, process knowledge graphs based on the process fragments and the set of actionable statements and business constraints;

perform, by the processor, processing of at least one hybrid rule-process model that includes a hybrid collection of the knowledge graphs, the processing obtains an action and metadata for each task node by traversing the hybrid knowledge graph from a root of an executable process through each task in the hybrid process knowledge graph and learning processing logic from the hybrid rule process model;

create, by the processor, using the learned processing logic, the action and metadata, executable rules and at least one actionable statement in an equivalent executable code block to represent the action;

map, by the processor, from the unstructured information to executables that include executable rules, the mapping includes processing of look-up tables that are used by authors of manuals in a mapping construction process, and mappings include attributes;

generate, by the processor, a cognitive executable process graph based on using a targeted domain model created from the mappings and at least one executable code block based on extraction of domain model building blocks and processed constructs around rules defining a decision tree, wherein the cognitive executable process graph is interpreted by the processor at execution time.

11. The computer program product of claim 10, wherein:

creating further comprises processing a link between tasks while considering relationships between tasks to arrange corresponding executable code blocks;

the different node types further comprise links to different entities in a space of that an action is operating on, and links to other systems, bots and individuals that have different roles and responsibilities;

an action comprises a task action to be performed;
the different relationship types are based on dependencies and constraints; and
the processed constructs may include concept reference, applications to interact with, and actions for accessing data.

12. The computer program product of claim 11, wherein executable code logic is created considering sequential, nested, and loop control flows in code of the executable process that is equivalent to the cognitive executable process graph, the cognitive executable process graph is enriched by adding logical terms and semi-formal statements of commands based on natural language, and the processed constructs further include key conceptual entities, key documents and a set of relevant applications including data objects.

13. The computer program product of claim 10, wherein:
the program instructions executable by the processor further cause the processor to:
obtain, by the processor, document information from document processing of unstructured data source information;
generate, by the processor, a text representation model based on the unstructured data source information;
extract, by the processor, the set of actionable statements and business constraints from text from the text representation model; and
for each actionable statement, extract, by the processor, business entities and the metadata;
the cognitive executable process graph comprises a formal process specification language;
the mapping uses a self-tuning mapping construction algorithm; and
the metadata is related to the actionable statements.

14. The computer program product of claim 10, wherein executable code of the cognitive executable graph is generated from a template, related placeholders in the template are filled based on action information in the hybrid process knowledge graph, the generated knowledge graph includes meta-rules for treatment of exclusions, and the attributes occur in different data sources.

15. The computer program product of claim 14, wherein:
the program instructions executable by the processor further cause the processor to:
detect, by the processor, a block of actions in a list to signal identification of a candidate process fragment;
the template comprises different executable blocks for different actions;
a process fragment further comprises an action, a condition and a rule;
a process comprises an action flow that defines order precedence of actions in a process fragment; and
all attributes of an action are linked to the action with at least one link.

16. An apparatus comprising:
a memory configured to store instructions; and
a processor configured to execute the instructions to:
receive a hybrid process knowledge graph from a computer process that generates the hybrid process knowledge graph based on a collection of process fragments and a set of actionable statements and business constraints, the process fragments identified from unstructured information by the processor determining process boundaries, the set of actionable statements and business constraints, the hybrid process knowledge graph including different node types comprising actions that are connected to other actions, and actions with different relationship types;
generate process knowledge graphs based on the process fragments and the set of actionable statements and business constraints;
perform processing of at least one hybrid rule-process that includes a hybrid collection of the knowledge graphs, the processing obtains an action and metadata for each task node by traversing the hybrid knowledge graph from a root of an executable process through each task in the hybrid process knowledge graph and learning processing logic from the hybrid rule process model;
create, using the learned processing logic, the action and metadata, executable rules and at least one actionable statement in an equivalent executable code block to represent the action;
map from the unstructured information to executables that include executable rules, the mapping includes processing of look-up tables that are used by authors of manuals in a mapping construction process, and mappings include attributes; and
generate a cognitive executable process graph using a targeted domain model created from the mappings and at least one executable code block based on extraction of domain model building blocks and processed constructs around rules defining a decision tree, wherein the cognitive executable process graph is interpreted by the processor at execution time.

17. The apparatus of claim 16, wherein:
creating further comprises processing a link between tasks while considering relationships between tasks to arrange corresponding executable code blocks;
the different node types further comprise links to different entities in a space of that an action is operating on, and links to other systems, bots and individuals that have different roles and responsibilities;
an action comprises a task action to be performed;
the different relationship types are based on dependencies and constraints;
executable code logic is created considering sequential, nested, and loop control flows in code of the executable process that is equivalent to the cognitive executable process graph, and the cognitive executable process graph is enriched by adding logical terms and semi-formal statements of commands based on natural language;
the cognitive executable process graph comprises a formal process specification language; and
the processed constructs may include concept reference, applications to interact with, and actions for accessing data.

18. The apparatus of claim 17, wherein:
the processor is further configured to execute the instructions to:
obtain document information from document processing of unstructured data source information;
generate a text representation model based on the unstructured data source information;
extract the set of actionable statements and business constraints from text from the text representation model; and
for each actionable statement, extracting business entities and the metadata;

the metadata is related to the actionable statements;

the cognitive executable process graph is generated from a template, and related placeholders in the template are filled based on action information in the hybrid process knowledge graph;

the mapping uses a self-tuning mapping construction algorithm; and the processed constructs further include key conceptual entities, key documents and a set of relevant applications including data objects.

19. The apparatus of claim 18, wherein:

the processor is further configured to execute the instructions to detect a block of actions in a list to signal identification of a candidate process fragment;

the generated knowledge graph includes meta-rules for treatment of exclusions;

the template comprises different executable blocks for different actions;

process fragments are hierarchical, and a process fragment comprises information on execution order and precedence of sub-process fragments; and the attributes occur in different data sources.

20. The apparatus of claim 19, wherein a process fragment further comprises an action, a condition and a rule, a process comprises an action flow that defines order precedence of actions or rules in a process fragment, and all attributes of an action are linked to the action with at least one link.

* * * * *